(12) United States Patent
Syring et al.

(10) Patent No.: US 6,744,625 B2
(45) Date of Patent: Jun. 1, 2004

(54) APPARATUS FOR RETAINING PERIPHERAL DEVICE

(75) Inventors: Harold Syring, Temple, TX (US); Alan Kyle, Temple, TX (US)

(73) Assignees: Wistron Corporation, Taipei Hsien (TW); Acer Incorporated, Taipei Hsien (TW)

(*) Notice: Subject to any disclaimer, the term of this patent is extended or adjusted under 35 U.S.C. 154(b) by 40 days.

(21) Appl. No.: 10/142,477

(22) Filed: May 10, 2002

(65) Prior Publication Data

US 2003/0210517 A1 Nov. 13, 2003

(51) Int. Cl.[7] .................................................. G06F 1/16
(52) U.S. Cl. ........................ 361/685; 361/725; 248/201; 364/708.1
(58) Field of Search ................................ 361/685–687, 361/680–682, 724–727; 248/271, 273, 201, 624; 364/708.1

(56) References Cited

U.S. PATENT DOCUMENTS 6,456,489 B1 * 9/2002 Davis et al. ................. 361/684
6,460,948 B2 * 10/2002 Roesner et al. ........... 312/223.1

* cited by examiner

Primary Examiner—Hung Van Duong
(74) Attorney, Agent, or Firm—Ladas & Parry

(57) ABSTRACT

An apparatus for retaining peripheral devices is provided. The peripheral device is provided with a plurality of mounting holes, and the retaining apparatus comprises a chassis and a plurality of retaining members. The chassis is provided with a plurality of locking members. The retaining members, having at least one protrusion and at least one retention tab, are disposed on the chassis so that the protrusion detachably engages with the locking member and the retention tabs insert into the mounting holes when the device is disposed inside the chassis.

16 Claims, 3 Drawing Sheets

APPARATUS FOR RETAINING PERIPHERAL DEVICE

BACKGROUND OF THE INVENTION

1. Field of the Invention

The invention relates to a computer system; in particular, the invention relates to a retaining apparatus for a peripheral device such as a hard disk drive.

2. Description of the Related Art

In the past, maintenance and upgrading of electrical equipment, especially rack mounted equipment, has been extremely difficult because of existing mounting mechanism. In many applications, including computer systems, accessibility is often limited. The computer system is relatively heavy and cumbersome, and its mounting arrangements are relatively stationary and bulky. When it is necessary to access a peripheral device mounted in the computer system, it has been necessary to perform considerable disassembly.

Peripheral devices are typically mounted in a chassis of the computer system with four fasteners, such as screws. However, such methods are very cumbersome. To alleviate these mounting problems, in many component or peripheral mounting arrangements, peripheral devices such as hard drives are mounted on removable sliding carriers. Such carriers are arranged to support, for example, a hard drive sliding along rails mounted to a peripheral unit mounting cabinet or shelving structure.

However, such carriers, in many cases, are relatively unstable and have therefore been vulnerable to damage from shock vibration. In addition, adding the carrier and rails renders this method more costly.

Thus, there is a need for a new design that mounts the peripheral device without the use of fasteners or carriers.

SUMMARY OF THE INVENTION

In order to address the disadvantages of the aforementioned computer system, the invention provides a retaining apparatus for a peripheral device without the use of fasteners.

Accordingly, the invention provides a computer system. The computer system comprises a chassis, at least one retaining member and at least one peripheral device. The chassis is provided with at least one locking member. The retaining member, having at least one protrusion and at least one retention tab, is disposed on the chassis so that the protrusion detachably engages with the locking member. The peripheral device, having at least one mounting hole, is detachably disposed inside the chassis so that the retention tab is inserted into the mounting hole when the protrusion engages with the locking member.

Furthermore, the retaining member is provided with a body portion and two locking portions. The body portion is flexible enough that the retention tab separates from the mounting hole when the protrusion separates from the locking member.

Furthermore, the protrusion is formed on the locking portion. The locking member is provided with an opening for engagement with the corresponding protrusion when the locking portion abuts the locking member.

Furthermore, the chassis is provided with a plurality of spring tabs. The chassis is provided with at least one support.

Furthermore, the chassis is provided with at least one through hole. The retaining member passes through the through hole in a manner such that the body portion locates inside the chassis and the locking portions locate outside the chassis.

In a preferred embodiment, the chassis is provided with at least one through hole corresponding to the retention tab. The retention tab passes through the corresponding through hole to engage with the corresponding mounting hole.

In a preferred embodiment, an apparatus for retaining a device with a plurality of mounting holes is provided, and it comprises a chassis and a plurality of retaining members. The chassis is provided with a plurality of locking members. The retaining members, having at least one protrusion and at least one retention tab, are disposed on the chassis so that the protrusion detachably engages with the locking member and the retention tabs insert into the mounting holes when the device is disposed inside the chassis.

BRIEF DESCRIPTION OF THE DRAWINGS

The invention is hereinafter described in detail with reference to the accompanying drawings in which.

DETAILED DESCRIPTION OF THE INVENTION

First Embodiment

Figure 1A:
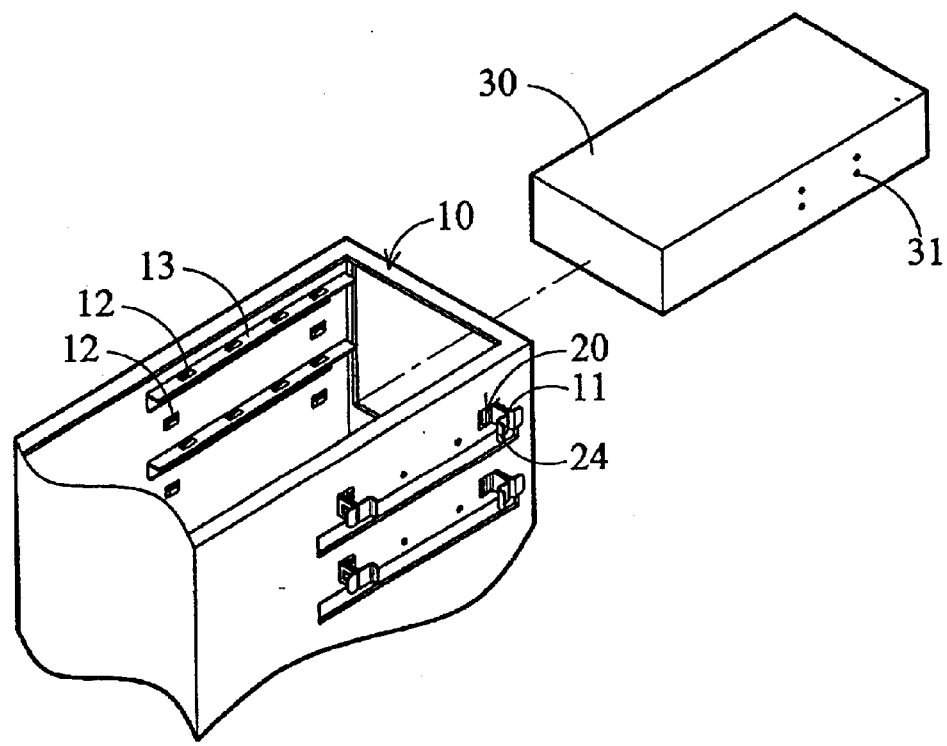
FIG. 1a is a schematic view depicting a computer system as disclosed in this invention, wherein a peripheral device is separated from a chassis.
Figure 1B:
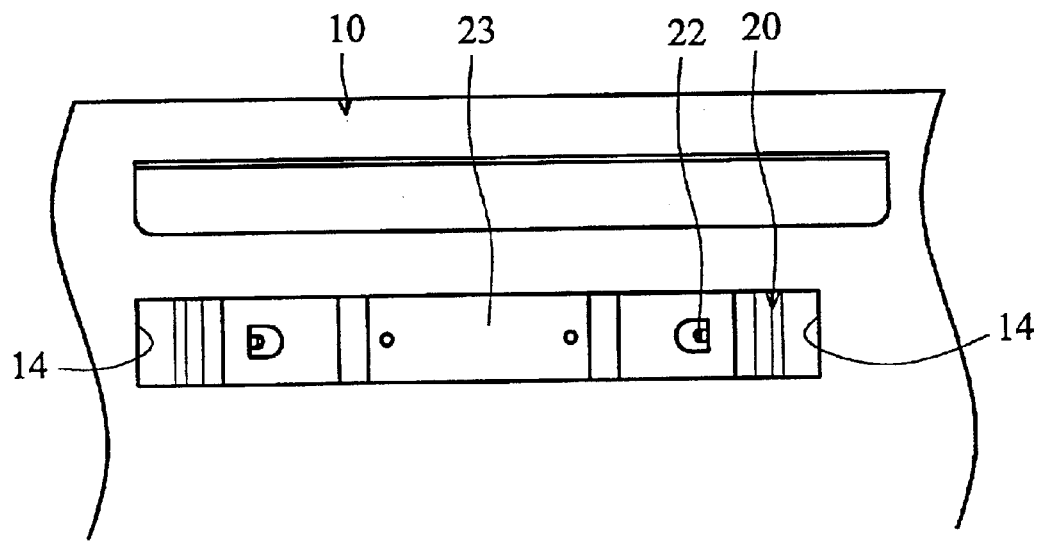
FIG. 1b is a plane view depicting a retaining apparatus as disclosed in this invention
Figure 2:
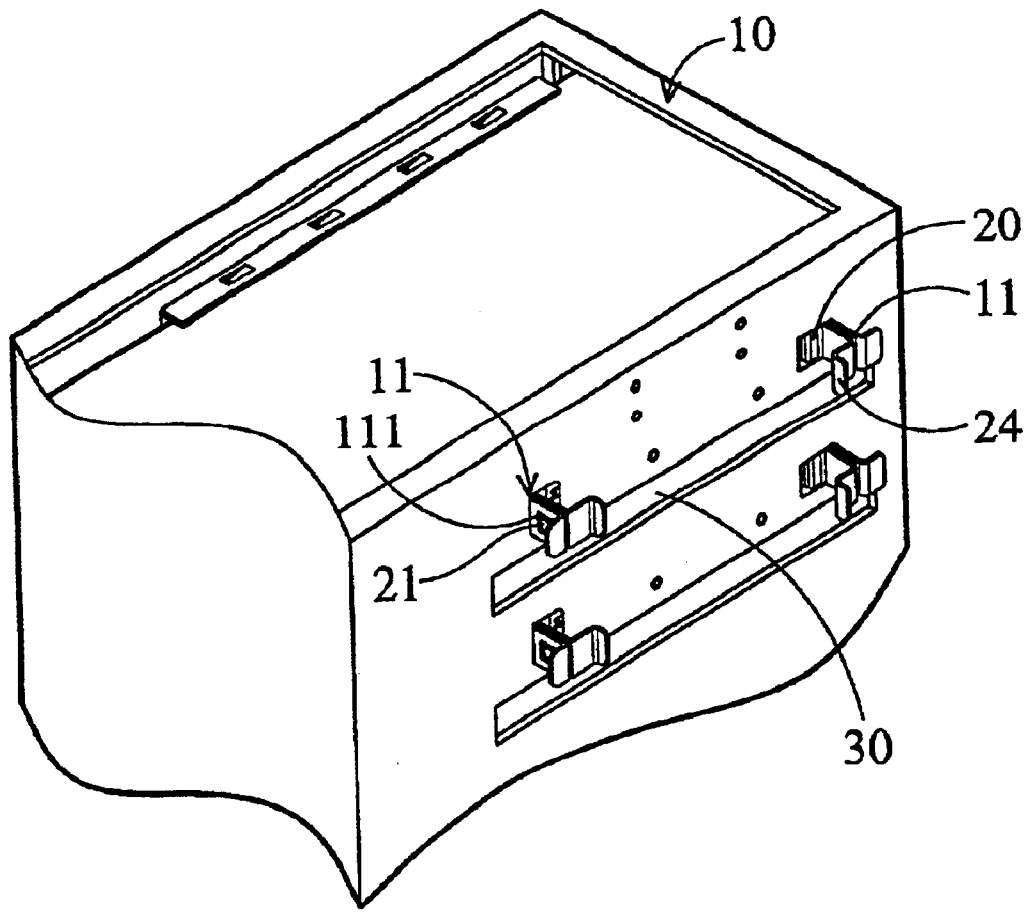
FIG. 2 is a schematic view depicting the computer system as shown in FIG. 1a, wherein the peripheral device combines with the chassis.

Referring to FIG. 1a, FIG. 1b and FIG. 2, a computer system, disclosed in this embodiment, comprises a chassis 10, three retaining members 20 and a peripheral device 30. The chassis 10 and the retaining members 20 consist of an apparatus for retaining a device. The peripheral device 30, having a plurality of mounting holes 31, is detachably disposed inside the chassis 10.

The chassis 10 is provided with a plurality of locking members 11, a plurality of spring tabs 12, a plurality of supports 13, and a plurality of through holes 14. Each of the locking members 11 is provided with an opening 111 for engagement with the retaining member 20 when the peripheral device 30 locates inside the chassis 10. It is noted that every two locking members 11 are arranged in line so as to lock the same retaining member 20.

The spring tabs 12, formed on the chassis 10 and the supports 13, can absorb tolerances between the inserted peripheral device 30 and the chassis 10, and hold the inserted peripheral device 30 firmly in position. The supports 13 can support the inserted peripheral device 30. Each of the through holes 14 is formed adjacent to a locking member 11 so that every two through holes 14 are arranged in line. In this embodiment, the two through holes 14, arranged in line, are used for the same retaining member 20 to pass through.

Each of the retaining members 20 is provided with two protrusions 21, corresponding to the locking members 11, and two retention tabs 22 corresponding to the mounting holes 31. Also, each of the retaining members 20 can be divided into a body portion 23 and two locking portions 24. By passing through the two through holes 14 arranged in line, the retaining member 20 is disposed on the chassis 10. The retaining member 20 can be fixed on the chassis 10 by fasteners (not shown). It is noted that the body portion 23 locates inside the chassis 10 and the locking portions 24 locate outside the chassis 10 when the retaining member 20 is disposed on the chassis 10. Each of the protrusions 21, formed on the locking portion 24, engages with the opening 111 of the locking member 11 when the locking portion 24 abuts the locking member 11. Each of the retention tabs 22, formed on the body portion 23, is inserted into the mounting hole 31 when the protrusions 21 engage with the opening 111 of the locking members 11. The body portion 23 is flexible enough that the retention tabs 22 separate from the mounting holes 31 when the protrusions 21 separate from the locking members 11.

It is noted that the quantity of retaining members 20 depends on the number of peripheral devices 30 to be inserted. Also, the retaining member 20 may be disposed on both sides of the chassis 10 for better positioning. In addition, the quantities of the locking members 11, the protrusions 21, and the retention tabs 22 are not limited to the drawings as long as the positioning between the peripheral device 30 and chassis 10 is assured.

Second Embodiment

Figure 3A:
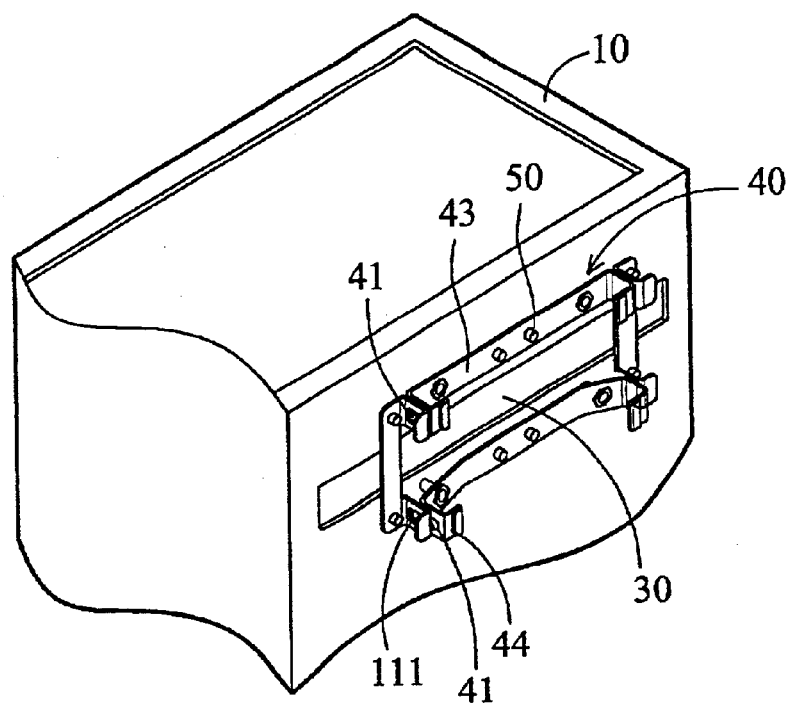
FIG. 3a and FIG. 3b are schematic views depicting another embodiment of a computer system as disclosed in this invention.
Figure 3B:
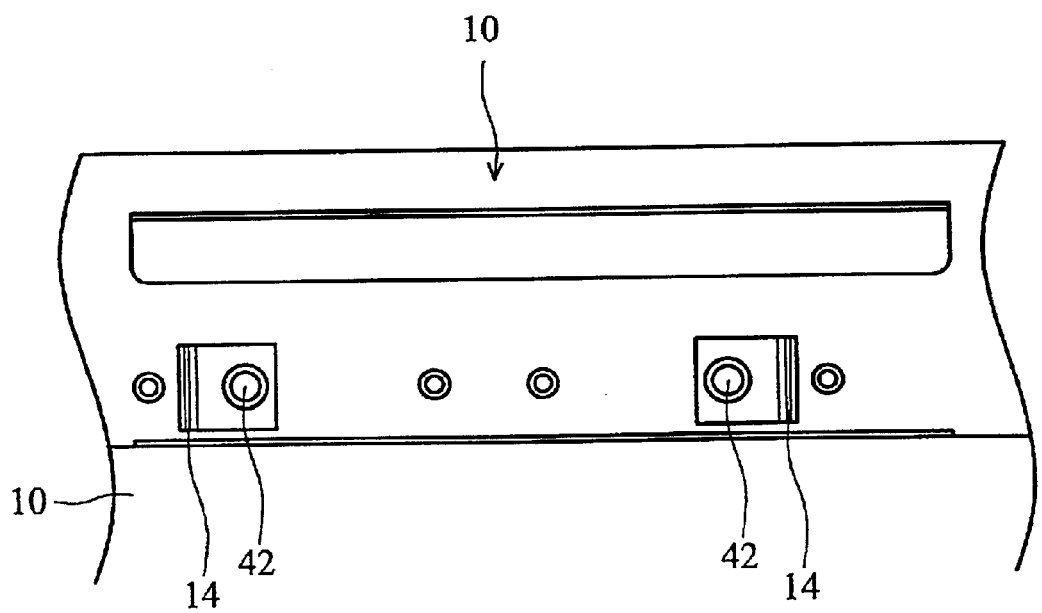

Referring to FIG. 3a and FIG. 3b, a computer system, disclosed in this embodiment, comprises a chassis 10, two retaining members 40, and a peripheral device 30. In this embodiment, the chassis 10 and the peripheral device 30 are the same as the first embodiment so that their description is omitted.

Each of the retaining members 40 is provided with two protrusions 41 and two retention tabs 42, and each of the retaining members 40 can be divided into a body portion 43 and two locking portions 44.

The difference between this embodiment and the first embodiment is the disposition of the retaining member 40 on the chassis 10. That is, the whole retaining member 40 is located outside the chassis 10 in this embodiment. The through holes 14 of the chassis 10 are used for the retention tabs 42 passing through to engage with the corresponding mounting hole 31. The retaining member 40 can be fixed on the chassis 10 by fasteners, such as screws 50.

The structure of the computer system of this invention is described as above, and the relationship between the peripheral device and chassis is described in detail as follows.

Before the peripheral device 30 is inserted into the chassis 10, the retaining member 20, 40 is in a position in which its protrusions 21, 41 do not engage with the openings 111 of the locking members 11, as shown by the bottom one in FIG. 3a. Then, after the peripheral device 30 is inserted into the chassis 11 along the supports 13, the locking portions 24, 44 of the retaining members 20, 40 are pushed toward the chassis 10 such that the retention tabs 22, 42 insert into the mounting holes 31 through the through holes 14 and the protrusions 21, 41 engage with the openings 111. Thus, the peripheral device 30 is solidly disposed inside the chassis 10.

To separate the inserted peripheral device 30 from the chassis 10, the locking portions 24, 44 are pulled away from the chassis 10 so that the protrusions 21, 41 separate from the openings 111. Thus, the retention tabs 22, 42 separate from the mounting holes 31 so that the inserted peripheral device 30 separates from the chassis 10.

As a result, this invention allows for tolerance variations while maintaining a tight fit without the use of fasteners or carriers. In addition, assembly cost is minimized by reducing parts, and labor effort is reduced by removing fasteners.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all is equivalents thereto.

What is claimed is:

1. A computer system comprising:
   a chassis provided with at least one locking member;
   at least one retaining member, having a body portion, at least two locking portions, a plurality of protrusions and at least one retention tab, disposed on the chassis so that the protrusions detachably engage with the locking member and wherein at least one protrusion is formed on each of the locking portions; and
   at least one peripheral device, having at least one mounting hole, detachably disposed inside the chassis so that the retention tab is inserted into the mounting hole when the protrusion engages with the locking member.

2. The computer system as claimed in claim 1, wherein the body portion is flexible enough that the retention tab separates from the mounting hole when the protrusions separate from the locking member.

3. The computer system as claimed in claim 1, wherein the chassis is provided with a plurality of spring tabs for holding the peripheral device disposed inside the chassis.

4. The computer system as claimed in claim 1, wherein the chassis is provided with at least one support for supporting the peripheral device disposed inside the chassis.

5. The computer system as claimed in claim 1, wherein the chassis is provided with at least one through hole corresponding to the retention tab, and the retention tab passes through the corresponding through hole to engage with the corresponding mounting hole.

6. The computer system as claimed in claim 2, wherein the locking member is provided with an opening for engagement with the corresponding protrusion when the locking portion abuts the locking member.

7. The computer system as claimed in claim 2, wherein the chassis is provided with a plurality of through holes, and the at least one retaining member passes through the through hole in a manner such that the body portion locates inside the chassis and the locking portions locate outside the chassis.

8. An apparatus for retaining a device with a plurality of mounting holes comprising:
   a chassis provided with a plurality of locking members; and
   a plurality of retaining members, having a body portion, at least two locking portions, a plurality of protrusions and at least one retention tab, disposed on the chassis so that the protrusions detachably engage with the locking members and the retention tabs insert into the mounting holes when the device is disposed inside the chassis and wherein at least one protrusion is formed on each of the locking portions.

9. The apparatus as claimed in claim 8, wherein the body portion is flexible enough that the retention tabs separate from the mounting holes when the protrusions separate from the locking members.

10. The apparatus as claimed in claim 8, wherein the chassis is provided with a plurality of spring tabs for holding the peripheral device disposed inside the chassis.

11. The apparatus as claimed in claim 8, wherein the chassis is provided with a plurality of supports for supporting the peripheral device disposed inside the chassis.

12. The apparatus as claimed in claim 8, wherein the chassis is provided with a plurality of through boles corresponding to the retention tabs, and each of the retention tabs passes through the corresponding through hole to engage with the corresponding mounting hole.

13. The apparatus as claimed in claim 9, wherein each of the locking members is provided with an opening for engagement with the corresponding protrusion when the locking portion abuts the locking member.

14. The apparatus as claimed in claim 9, wherein the chassis is provided with a plurality of through holes, and each of the retaining members passes through the through holes in a manner such that the body portion locates inside the chassis and the locking portions locate outside the chassis.

15. A computer system comprising:

a chassis provided with at least one locking member and a plurality of through holes;

at least one retaining member, having a body portion, at least two locking portions, at least one protrusion and at least one retention tab, disposed on the chassis so that the protrusion detachably engages with the locking member, wherein the body portion is flexible enough that the retention tab separates from the mounting hole when the protrusion separates from the locking member, and the at least one retaining member passes through the through hole in a manner such that the body portion locates inside the chassis and the locking portions locate outside the chassis; and at least one peripheral device, having at least one mounting hole, detachably disposed inside the chassis so that the retention tab is inserted into the mounting hole when the protrusion engages with the locking member.

16. An apparatus for retaining a device with a plurality of mounting holes comprising:

a chassis provided with a plurality of locking members and a plurality of through holes; and a plurality of retaining members, having a body portion, two locking portions, at least one protrusion and at least one retention tab, disposed on the chassis so that the protrusion detachably engages with the locking members and the retention tabs insert into the mounting holes when the device is disposed inside the chassis, wherein the body portion is flexible enough that the retention tabs separate from the mounting holes when the protrusions separate from the locking members and each of the retaining members passes through the through holes in a manner such that the body portion locates inside the chassis and the locking portions locate outside the chassis.

* * * * *